(12) United States Patent
Nou

(10) Patent No.: US 6,954,556 B2
(45) Date of Patent: Oct. 11, 2005

(54) SMOOTHING METHOD, SMOOTHING CIRCUIT AND IMAGE OUTPUT APPARATUS

(75) Inventor: Hiroshi Nou, Kawasaki (JP)

(73) Assignee: Fuji Xerox Co., LTD, Tokyo (JP)

( * ) Notice: Subject to any disclaimer, the term of this patent is extended or adjusted under 35 U.S.C. 154(b) by 628 days.

(21) Appl. No.: 10/102,745

(22) Filed: Mar. 22, 2002

(65) Prior Publication Data

US 2003/0026496 A1 Feb. 6, 2003

(30) Foreign Application Priority Data

Aug. 2, 2001 (JP) ........................................ 2001-235080

(51) Int. Cl.⁷ ................................................ G06K 9/40
(52) U.S. Cl. ........................ 382/264; 382/205; 358/2.99
(58) Field of Search ................................ 382/264, 205; 358/2.99

(56) References Cited

U.S. PATENT DOCUMENTS

| | | | | |
|---|---|---|---|---|
| 5,200,841 A | * | 4/1993 | Kotaki et al. ............... | 358/2.99 |
| 5,249,242 A | * | 9/1993 | Hanson et al. .............. | 382/269 |
| 5,475,496 A | * | 12/1995 | Kumada ..................... | 358/2.99 |
| 5,572,603 A | * | 11/1996 | Koike ......................... | 382/199 |
| 5,701,363 A | * | 12/1997 | Hanyuh ........................ | 382/174 |
| 5,719,967 A | * | 2/1998 | Sekine ........................ | 382/266 |
| 5,760,921 A | * | 6/1998 | Miyake ....................... | 358/3.07 |
| 5,784,500 A | * | 7/1998 | Homma et al. ............. | 382/270 |
| 6,577,774 B1 | * | 6/2003 | Asada ......................... | 382/264 |
| 6,707,579 B1 | * | 3/2004 | Komiya et al. .............. | 358/3.1 |
| 6,781,718 B2 | * | 8/2004 | Sato ............................ | 358/1.9 |
| 6,842,267 B1 | * | 1/2005 | Morimatsu ................. | 358/3.03 |
| 6,850,340 B1 | * | 2/2005 | Ohshita ...................... | 358/1.2 |

FOREIGN PATENT DOCUMENTS

JP  2000-92327  3/2000

* cited by examiner

Primary Examiner—Joseph Mancus
Assistant Examiner—Manav Seth
(74) Attorney, Agent, or Firm—Westerman, Hattori, Daniels & Adrian, LLP

(57) ABSTRACT

A smoothing method extracts an evaluation window including a target pixel of a multi-value image data in which tone is represented by a multi-value in units of pixels, and judges black and white of the target pixel according to a predetermined rule, and binarizes pixel data within the evaluation window. Further, the smoothing method generates a correction value based on collating binarized pixel data within the evaluation window and a look-up table which stores patterns in vicinities of the target pixel, and outputs a multi-value correction signal in which the correction value is converted into a multi-value.

11 Claims, 19 Drawing Sheets

PRIOR ART

PRIOR ART
FIG. 4A
TARGET PIXEL N,M-1
FIG. 4B
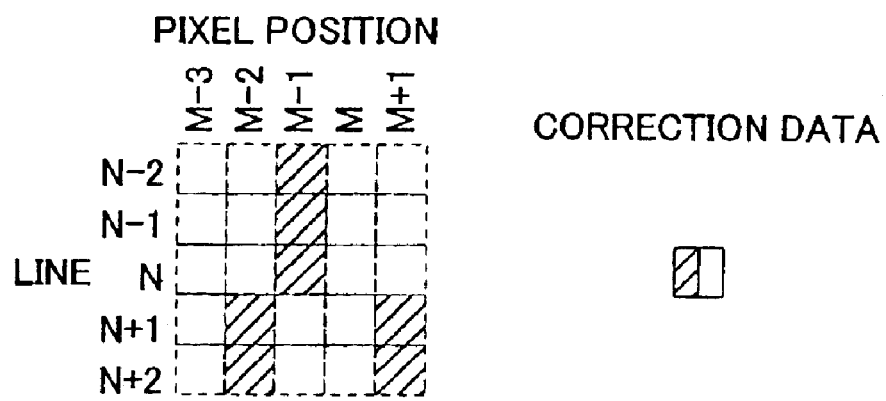
FIG. 4C
TARGET PIXEL N,M+1
FIG. 4D
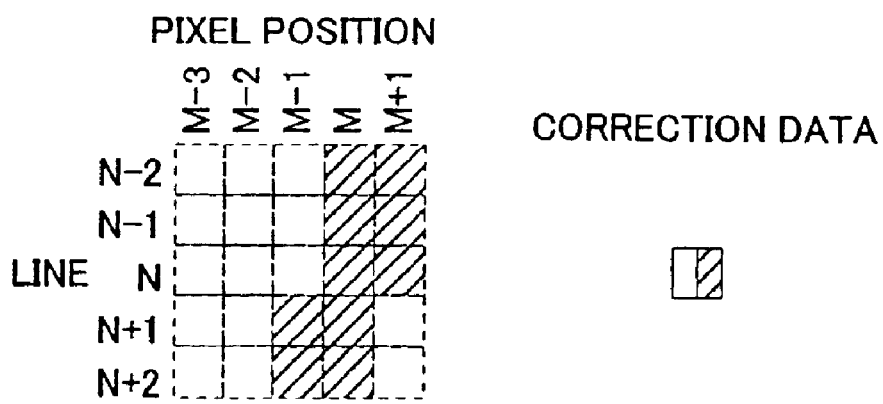

PRIOR ART

IMAGE MEMORY DATA

CORRECTION SIGNAL

PRINTED RESULT

EVALUATION WINDOW

| 4 | 8 | 6 |
|---|---|---|
| 4 | 8 | 6 |
| 8 | 6 | 0 |

⟹ BINARIZE (th=2)

| 0 | 1 | 0 |
|---|---|---|
| 0 | 1 | 0 |
| 1 | 0 | 0 |

EVALUATION WINDOW     BINARY EVALUATION WINDOW

EVALUATION  BINARY       LUT          CORRECTION
WINDOW      EVALUATION   CORRECTION   VALUE
            WINDOW       VALUE        OUTPUT
                         (BINARY)     (MULTI-VALUE)

EVALUATION  BINARY       LUT          CORRECTION
WINDOW      EVALUATION   CORRECTION   VALUE
            WINDOW       VALUE        OUTPUT
                         (BINARY)     (MULTI-VALUE)

EVALUATION WINDOW  BINARY EVALUATION WINDOW  LUT CORRECTION VALUE (BINARY)  CORRECTION VALUE OUTPUT (MULTI-VALUE)

EVALUATION WINDOW  BINARY EVALUATION WINDOW  LUT CORRECTION VALUE (BINARY)  CORRECTION VALUE OUTPUT (MULTI-VALUE)

EVALUATION　　BINARY　　　　LUT　　　　　MULTI-VALUE
WINDOW　　　　EVALUATION　　CORRECTION　CORRECTION
　　　　　　　WINDOW　　　　VALUE　　　　VALUE

SMOOTHING METHOD, SMOOTHING CIRCUIT AND IMAGE OUTPUT APPARATUS

BACKGROUND OF THE INVENTION

This application claims the benefit of a Japanese Patent Application No. 2001-235080 filed Aug. 2, 2001, in the Japanese Patent Office, the disclosure of which is hereby incorporated by reference.

1. Field of the Invention

The present invention generally relates to smoothing methods, smoothing circuits and image output apparatuses, and more particularly to a smoothing method and a smoothing circuit which are suited for printers and display units which treat multi-value (or multi-level) image data, and to an image output apparatus which employs such a smoothing method and smoothing circuit.

The multi-value image data generated by a computer or the like is output to an image output apparatus such as the printer and the display unit. Particularly in the case of an image made up of characters and line drawings, a smoothing process is carried out as an image quality improving process to make jaggy portions which are caused by pixels (dots) to become less conspicuous.

2. Description of the Related Art

FIG. 1 is a diagram showing the construction of an example of a conventional laser beam printer. The laser beam printer generally includes a main body 1, an image memory 12, an image developing section 13, a control circuit 14, and an optical modulating signal generating circuit 15.

The main body 1 includes an optical section 2 and an image forming section 11. The optical section 2 includes a laser diode 3 which emits a laser beam, a polygonal mirror 4 which deflects the laser beam so as to make repeated scans, a mirror motor 5 which rotates the polygonal mirror 4, and a beam detector 6 which detects a start of the scan of the laser beam. The image forming section 11 includes a photoconductive drum 7, a developing unit 8, a transfer roller 10, and a mirror 9.

The surface of the photoconductive drum 7 is charged by a charger (not shown), and the laser beam thereafter irradiates the charged surface. The laser diode 3 is modulated in synchronism with the scan of the laser beam and the rotation of the photoconductive drum 7, so that an optical image corresponding to the image to be printed is formed on the surface of the photoconductive drum 7. The electrostatic charge on the surface of the photoconductive drum 7 decreases depending on the amount of irradiation of the laser beam, to form an electrostatic latent image. When toner is supplied from the developing unit 8 to the charged surface of the photoconductive drum 7, the toner adheres on the surface of the photoconductive drum 7 depending on the electrostatic latent image, to thereby visualize the electrostatic latent image into a toner image. A recording medium such as paper is transported to contact the surface of the photoconductive drum 7 having the toner image, and the toner image is transferred onto the recording medium by the transfer roller 10. The toner image on the recording medium is fixed by a fixing unit (not shown), and the printing ends. The surface of the photoconductive drum 7 after the toner image is transferred onto the recording medium is cleaned, before the surface of the photoconductive drum 7 is again charged to repeat the above described process.

The print data received from a computer system (not shown) or the like is developed into print image data by the image developing section 13 and stored in the image memory 12. Generally, the image memory 12 is referred to as a bit-map memory, and in the case of a binary print data, each bit of the bit-map memory, that is, one bit, corresponds to a printing pixel. In the case of a multi-value print data, several bits of the bit-map memory correspond to the printing pixel. For example, in the case of a 4-bit print data, the bit-map memory used has a 4-bit structure. The 4-bit print data can represent 16 gradation levels in units of pixels. The optical modulating signal generating circuit 15 reads the image data stored in the image memory 12 in synchronism with the process in the main body 1, and generates an optical modulating signal which is supplied to the laser diode 3.

In a single-color binary printing apparatus such as a monochromatic laser beam printer, the jaggy generated at the time of printing the characters and line drawings from the print bit map data developed in the image memory 12 is judged automatically, and the input image data is converted into an image data having a higher resolution that the input image data, before carrying out the smoothing process to make the jaggy less conspicuous.

FIGS. 2A through 2C are diagrams for explaining the smoothing process with respect to the binary image data. For example, if the print image data stored in the image memory 12 includes a vertical line which is deviated by one pixel (dot) at an intermediate portion thereof as shown in FIG. 2A, this deviated portion corresponds to the jaggy described above. The smoothing process judges the jaggy by carrying out a pattern matching including the neighboring pixel data. In addition, an output timing of the optical modulating signal is adjusted as shown in FIG. 2B at the jaggy portion. As a result, the printing is carried out in a state shifted by one-half dot at the jaggy portion, as shown in FIG. 2C, so that the vertical line changes smoothly, so that the jaggy is reduced. In this particular case, the image data is shifted by one-half dot in the same direction, but the shift may be made either to the right or left. In other words, the smoothing process enables the printing at a resolution which is an integral multiple of that of the original image data in a main scanning direction of the laser beam, and carries out a process of adding or removing dots at the jaggy portion.

FIG. 3 is a system block diagram showing an example of the construction of a smoothing circuit which carries out a smoothing process with respect to binary print data. As shown in FIG. 3, the optical modulating signal generating circuit 15 includes an image memory read section 16 and a smoothing circuit 17. Further, the smoothing circuit 17 includes a line buffer 18, an evaluation window extracting section 21, and a correction signal generating section 22.

The image memory read section 16 reads from the image memory 12 the bit-map data of several lines before the print data which is being exposed by the laser diode 3, and transfers the bit-map data to the line buffer 18. The line buffer 18 is made up of a shift register, and holds the data of several lines before and after the print data which is being exposed.

The evaluation window extracting section 21 extracts the data of a rectangular region (hereinafter referred to as an "evaluation window") 19 having one target pixel (dot) 20 from the data held in the line buffer 18, and outputs an extracted pattern arrangement signal which indicates the pixel arrangement of the evaluation window 19. The extracted pattern arrangement signal is input to the correction signal generating circuit 22. The correction signal generating circuit 22 generates a correction signal (correction value) with respect to the target pixel 20, based on the dot arrangement within the evaluation window 19 indicated by the extracted pattern arrangement signal. The correction signal generating circuit 22 includes a look-up table which stores various kinds of patterns in a vicinity with respect to the target pixel 20, and collates the input extracted pattern arrangement signal and the look-up table, and outputs a correction signal which is stored in correspondence with the collated result. For example, if no correction is required, the modulating signal is generated based on the pixel data as it is and output as the correction signal. On the other hand, if correction is required, the correction signal is generated based on the prestored correction data.

FIGS. 4A through 4D are diagrams for explaining the smoothing process with respect to the pixel data having the dot arrangement pattern shown in FIG. 2A. FIG. 4A shows the pattern of the extracted evaluation window for a case where the pixel at the line N and the pixel position M−1 is regarded as the "target pixel", and the "target pixel" and the neighboring pixels are extracted with a window size of 5×5 pixels. When it is judged that the print data and such a pattern stored in the look-up table match, it is judged that the correction of the pixel at the line N and the pixel position M−1 is required, and the correction data shown in FIG. 4B is output. The optical modulating signal is generated based on this correction data. As will be described later, the correction data is also generated with respect to the pixel at the line N and the pixel position M−2, and the optical modulating signal is generated based on the correction data.

FIG. 4C shows the pattern of the extracted evaluation window for a case where the pixel at the line N and the pixel position M+1 is regarded as the "target pixel", and the "target pixel" and the neighboring pixels are extracted with a window size of 5×5 pixels. When it is judged that the print data and such a pattern stored in the look-up table match, it is judged that the correction of the pixel at the line N and the pixel position M+1 is required, and the correction data shown in FIG. 4D is output. The optical modulating signal is generated based on this correction data.

In the smoothing circuit shown in FIG. 3, the "target pixel" is successively moved in synchronism with the pixel print timing in the main body 1, and the optical modulating signal of the "target pixel" position is output when printing the pixel located at the position actually corresponding to the "target position". A control clock for controlling this operation timing is generated by a control clock signal generating section 23 within the control circuit 14.

The description given heretofore applies to the case where the pixels are corrected by doubling the resolution in the main scanning direction. However, the process can be carried out similarly when correcting the pixels to make the resolution in the main scanning direction to become three or more times.

Multi-value printing apparatuses have also been proposed, which can represent half-tone pixels in units of printing pixels, in addition to the black-and-white binary pixels. For example, in the case of the laser beam printer shown in FIG. 1, it is possible to vary the size of the printing pixel formed by the image forming section 11 and equivalently vary the tone of the printing pixel, by controlling the light emission amount or the light emission time of the laser diode 3 of the optical section 2.

FIG. 5 is a system block diagram showing the construction of an example of a laser beam printer which carries out the multi-value printing in units of printing pixels, by varying the light emission amount of the laser diode. In this case, the main body 1 has the same construction as that shown in FIG. 1. The multi-value printing bit-map data having tone gradation is developed in the image memory 31, and an image memory read section 33 within the optical modulating signal generating circuit 32 reads the pixel data from the image memory 31 in synchronism with the pixel print timing in the image forming section 11. The pixel data read from the image memory 31 is converted by a digital-to-analog (D/A) converter 34 into the optical modulating signal having an analog intensity corresponding to the multi-value data depending on the tone value of the pixel data.

The smoothing process is also carried out in the laser beam printer which carries out the multi-value printing. FIGS. 6A through 6C are diagrams for explaining an example of the smoothing process with respect to a 4-value image data. FIG. 6A shows an example of the pattern of the 4-value bit-map data in the image memory 31, FIG. 6B shows the optical modulating signal for the case where the multi-value printing is carried out in units of printing pixels by varying the laser light emission amount, and FIG. 6C shows the printed result.

A smoothing circuit having a construction similar to that shown in FIG. 3 is used when carrying out the smoothing process with respect to the multi-value data shown in FIGS. 6A through 6C, and the only difference is that the pixel data is the multi-value data. For this reason, the line buffer 18 must be capable of storing the multi-value data, the evaluation window extracting section 21 must be capable of extracting and transferring the extracted pattern arrangement signal of the multi-value data to the correction signal generating section 22, and the correction signal generating section 22 must include a multi-value look-up table. However, if the number of tones including white that can be represented by the printing pixel unit is denoted by C, the number of combinations of the patterns which are extracted as the evaluation window becomes $(C/2)^{25}$ times the case of binary data. In addition, since the correction signal (correction value) also represents C tones, the size of the look-up table further becomes D times, where D is an integer satisfying a condition $2^{D-1} < C \leq 2^D$.

Therefore, when the conventional smoothing circuit is applied as it is to the smoothing process of the multi-value image in the multi-value printing apparatus, there are problems in that the size of the required look-up table becomes extremely large, and it is complicated to create the table data because of the large number of combinations of the pixel arrangement and the tone.

In order to eliminate these problems, a multi-value smoothing method was previously proposed in a Japanese Laid-Open Patent Application No. 11-319957. In this previously proposed multi-value smoothing method, the input multi-value image data is decomposed into a plurality of tone planes depending on the tone that can be represented in units of pixels, and the arrangement of the pixels is corrected by combining correction signals which are output as results of the smoothing process for each of the tone planes, as shown in FIGS. 7 and 8. FIG. 7 is a system block diagram showing the construction of an example of the smoothing circuit which carries out the smoothing process with respect to the multi-value print data. Further, FIG. 8 is a diagram for explaining the smoothing process with respect to the multi-value print data.

The laser beam printer shown in FIG. 7 is provided with an optical modulating signal generating circuit 42, and carries out the printing in four gradation levels including black and white in units of printing pixels. The optical section 2 and the image forming section 11 within a main body (not shown) of the laser beam printer has a construction similar to that shown in FIG. 1. An image memory 41 is made up of a 2-bit bit-map memory, and the image data are developed in advance in the image memory 41 by an image developing section (not shown) in a printable state. Since three gradation levels excluding white can be represented in units of printing pixels, three tone planes are prepared. For the sake of convenience, the tone of the printing pixel is represented by numerical values 0 to 3, with the larger numerical value representing a higher (darker) tone, the tone 0 representing white, and the tone 3 representing black.

The optical modulating signal generating circuit 42 is controlled to output the optical modulating signal in synchronism with the progress of the image write process in the main body, in response to a plurality of control clock signals which are generated by a control clock signal generating section 55 based on an optical scan timing signal which is output from the optical section 11.

The multi-value image data read from the image memory 41 by the image memory read section 43 is supplied to a tone decomposing section 45. The tone decomposing section 45 distributively outputs the binarized pixel data to a plane-1 correcting section 46-1 through a plane-3 correcting section 46-3 depending on a predetermined distribution rule, based on the tone of the pixel.

The plane-1 correcting section 46-1 through the plane-3 correcting section 46-3 carry out a smoothing process with respect to the input pixel data, and outputs a correction signal having a corresponding level. The binarized pixel data is input to each of the plane-1 correcting section 46-1 through the plane-3 correcting section 46-3. For this reason, the plane-1 correcting section 46-1 through the plane-3 correcting section 46-3 have the same construction as the corresponding section of the conventional monochromatic binary printing apparatus, and the same correction rule can be employed. In other words, it is possible to use the circuit shown in FIG. 3 as it is. The correction signals output from the plane-1 correcting section 46-1 through the plane-3 correcting section 46-3 are combined according to a predetermined combining rule in a correction signal combining section 52, and a combined output is supplied to a digital-to-analog (D/A) converter 53. An output of the D/A converter 53 is supplied to the laser diode of the optical section 2 as the optical modulating signal.

According to the predetermined distribution rule employed by the tone decomposing section 45, the pixel data is decomposed into tone planes for each of the pixel tones in the image memory 41 and distributed, for example. Hence, the pixel data having the tone 1 within the image memory 41 is distributed to the plane-1, the pixel data having the tone 2 is distributed to the plane-2, and the pixel data having the tone 3 is distributed to the plane-3. In addition, according to the predetermined combining rule employed by the correction signal combining section 52, if a plane in which the tone is other than zero exists with respect to the same printing pixel, for example, the correction signal of the plane with the highest tone is output with priority over others.

In the pattern shown in FIG. 8, the vertical lines have a jaggy portion at an intermediate portion. Vertical lines having low tones 1 and 2 in two stages are interposed between two vertical lines having a higher tone 3. In addition, a vertical line having a tone 2 is provided on the right side of the right vertical line having the tone 3. The data of this pattern is developed in the bit-map memory, that is, the image memory 41, as shown on the top left of FIG. 8. The pattern is distributed to each of the plane-1, plane-2 and plane-3 as shown in FIG. 8, and an independent smoothing process is carried out in each of the plane-1, plane-2 and plane-3. As a result, three corrected outputs are obtained as shown in FIG. 8. When the three corrected outputs are combined according to the predetermined combining rule described above, a printed result shown on the top right of FIG. 8 is obtained.

However, according to this multi-value smoothing method, if the number of gradation levels is increased so as to improve the half-tone representation and improve the printing quality, that is, if the number of output levels that can be output is increased, the number of tone planes to which the pixel data are to be decomposed increases. As a result, there was a problem in that the scale of the hardware of the smoothing circuit becomes large.

SUMMARY OF THE INVENTION

Accordingly, it is a general object of the present invention to provide a novel and useful smoothing method and smoothing circuit, in which the problems described above are eliminated.

Another and more specific object of the present invention is to provide a smoothing method and a smoothing circuit, which can carry out a smoothing process of a multi-value image using a simple construction, without having to increase the size of a look-up table which is required compared to a look-up table which is used to carry out a smoothing process of binary image data.

Still another object of the present invention is to provide a smoothing method comprising the steps of (a) extracting an evaluation window including a target pixel of a multi-value image data in which tone is represented by a multi-value in units of pixels; (b) judging black and white of the target pixel according to a predetermined rule, and binarizing pixel data within the evaluation window; and (c) generating a correction value based on collating binarized pixel data within the evaluation window and a look-up table which stores patterns in vicinities of the target pixel, and outputting a multi-value correction signal in which the correction value is converted into a multi-value. According to the smoothing method of the present invention, it is possible to carry out a smoothing process of the multi-value image using a simple construction, without having to increase the size of the look-up table which is required compared to a look-up table which is used to carry out a smoothing-process of binary image data.

A further object of the present invention is to provide a smoothing circuit comprising an evaluation window extracting section extracting an evaluation window including a target pixel of a multi-value image data in which tone is represented by a multi-value in units of pixels; a black and white judging and binarization process section judging black and white of the target pixel according to a predetermined rule, and binarizing pixel data within the evaluation window; and a correction signal generating section generating a correction value based on collating binarized pixel data within the evaluation window and a look-up table which stores patterns in vicinities of the target pixel, and outputting a multi-value correction signal in which the correction value is converted into a multi-value. According to the smoothing circuit of the present invention, it is possible to carry out a smoothing process of the multi-value image using a simple construction, without having to increase the size of the look-up table which is required compared to a look-up table which is used to carry out a smoothing process of binary image data.

Another object of the present invention is to provide an image output apparatus comprising a smoothing circuit which smoothens an input multi-value image data, and an image output section outputting image data smoothened by the smoothing circuit, wherein the smoothing circuit comprises an evaluation window extracting section extracting an evaluation window including a target pixel of the input multi-value image data in which tone is represented by a multi-value in units of pixels; a black and white judging and binarization process section judging black and white of the target pixel according to a predetermined rule, and binarizing pixel data within the evaluation window; and a correction signal generating section generating a correction value based on collating binarized pixel data within the evaluation window and a look-up table which stores patterns in vicinities of the target pixel, and outputting a multi-value correction signal in which the correction value is converted into a multi-value. According to the image output apparatus of the present invention, it is possible to carry out the smoothing process of the multi-value image using a simple construction, without having to increase the size of the look-up table which is required compared to a look-up table which is used to carry out a smoothing process of binary image data, so that an image having a high image quality is output.

Other objects and further features of the present invention will be apparent from the following detailed description when read in conjunction with the accompanying drawings.

BRIEF DESCRIPTION OF THE DRAWINGS

FIGS. 4A through 4D are diagrams for explaining a smoothing process with respect to pixel data having a dot arrangement pattern shown in FIG. 2A;

DESCRIPTION OF THE PREFERRED EMBODIMENTS

In a smoothing circuit according to the present invention, a target pixel within an evaluation window which is extracted by an evaluation window extracting section is compared with adjacent pixels and subjected to black-and-white judgement, so as to binarize the pixel data. The evaluation window made up of the binarized pixel data is collated with a look-up table so as to generate a binary correction value. Finally, the correction value is restored to a multi-value with reference to the original data, so as to generate a multi-value correction value.

In other words, the smoothing circuit is provided in an image output apparatus such as a printer and a display unit which are capable of forming an image with at least one tone other than black and white binary values in units of pixels, and includes the evaluation window extracting section, a black-and-white judging and binarization process section, and a correction signal generating section. The evaluation window extracting section extracts the evaluation window which includes the target pixel of the multi-value image data. The black-and-white judging and binarization process section carries out a black-and-white judgement with respect to the target pixel according to a predetermined rule and binarizes the pixel data within the evaluation window. The correction value generating section collates the pixel data within the evaluation window and the look-up table and converts the correction signal into the multi-value based on the collated result, so as to output the multi-value correction signal for correcting the pixel data including the pixel arrangement.

Figure 3:
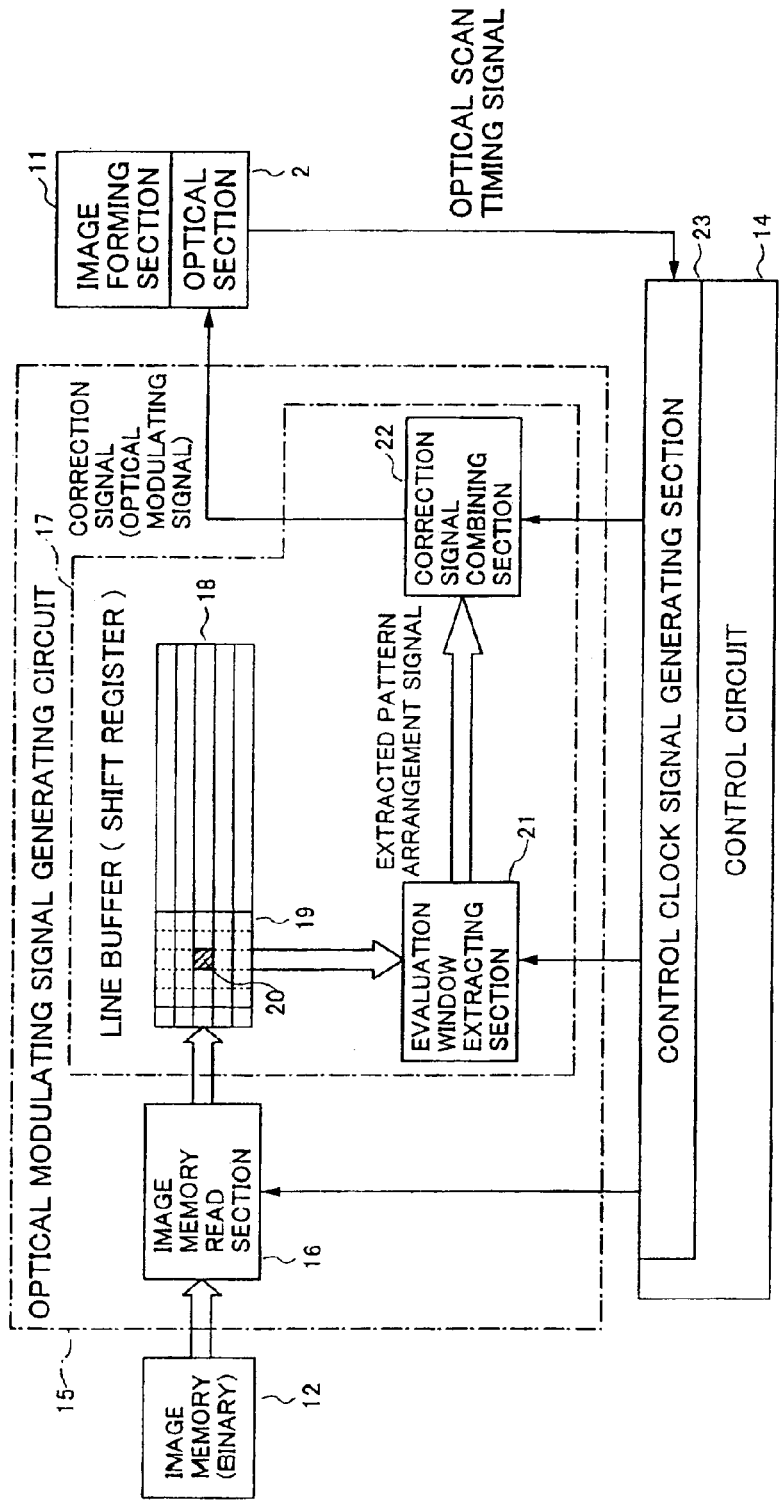
FIG. 3 is a system block diagram showing the construction of an example of a smoothing circuit which carries out a smoothing process with respect to binary print data.
Figure 5:
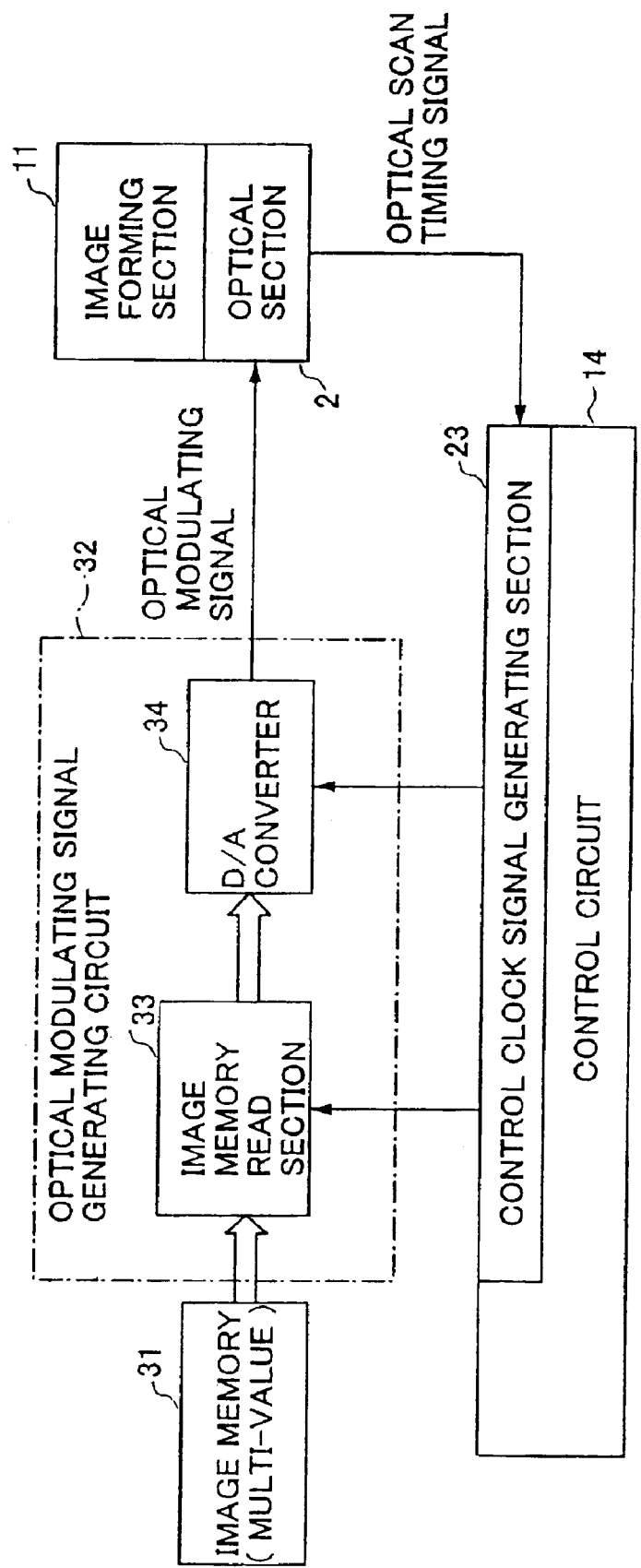
FIG. 5 is a system block diagram showing the construction of an example of a laser beam printer which carries out multi-value printing in units of printing pixels by varying a light emission amount of a laser diode.
Figure 6A:
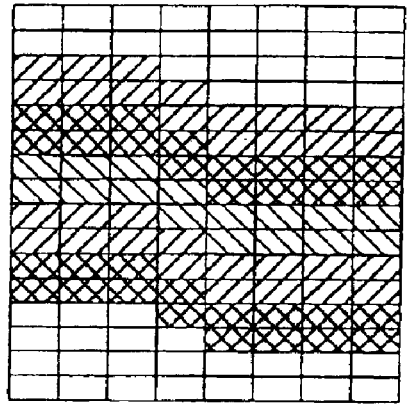
FIGS. 6A through 6C are diagrams for explaining an example of a smoothing process with respect to 4-value image data.
Figure 6B:
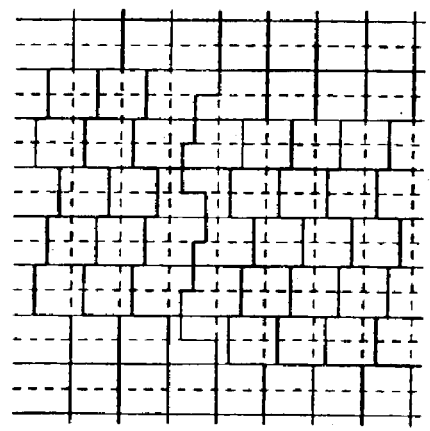
Figure 6C:
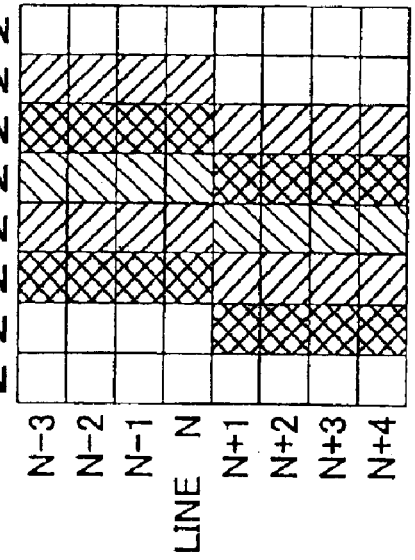
Figure 7:
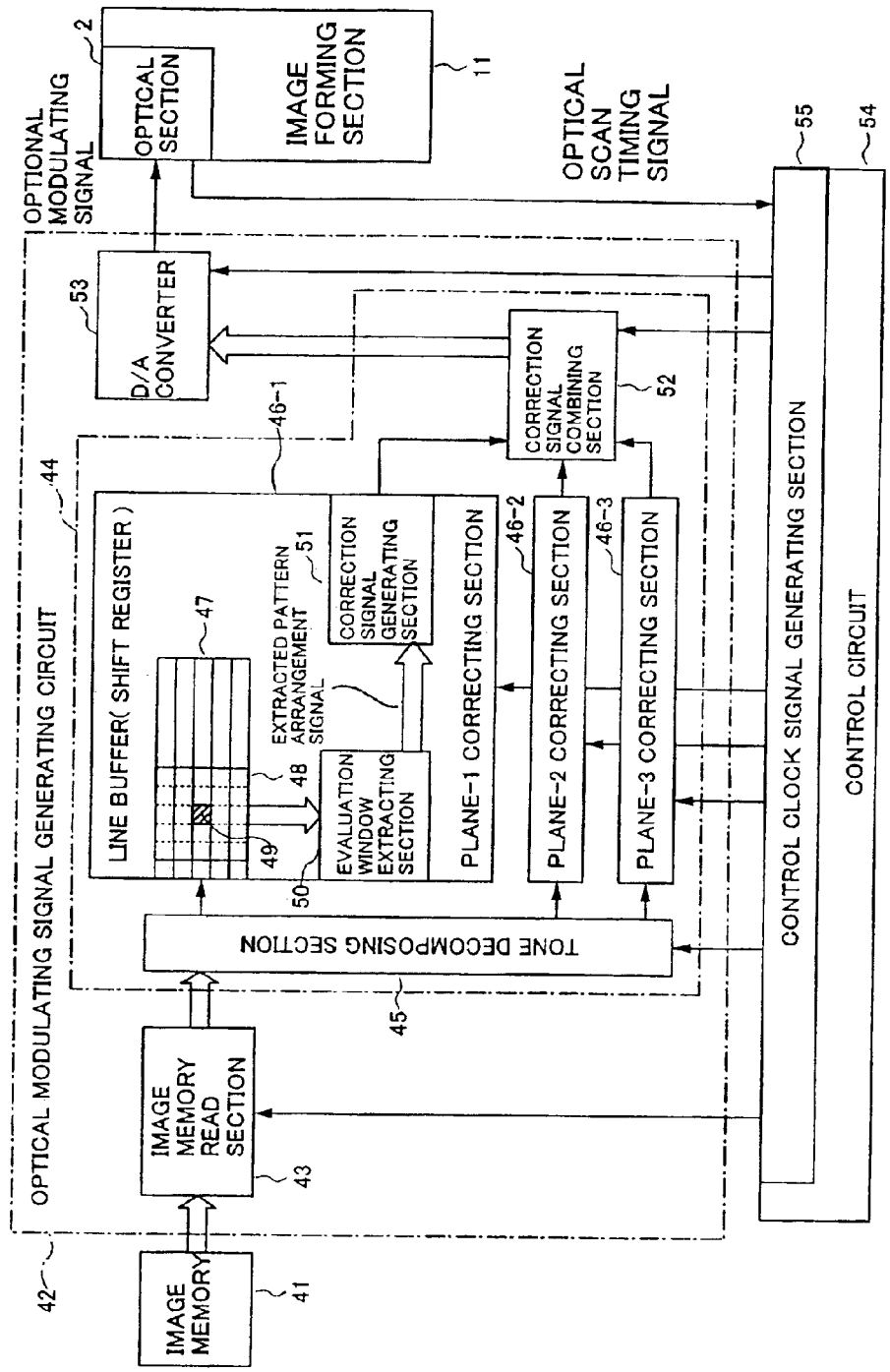
FIG. 7 is a system block diagram showing the construction of an example of a smoothing circuit which carries out a smoothing process with respect to multi-value print data.
Figure 8:
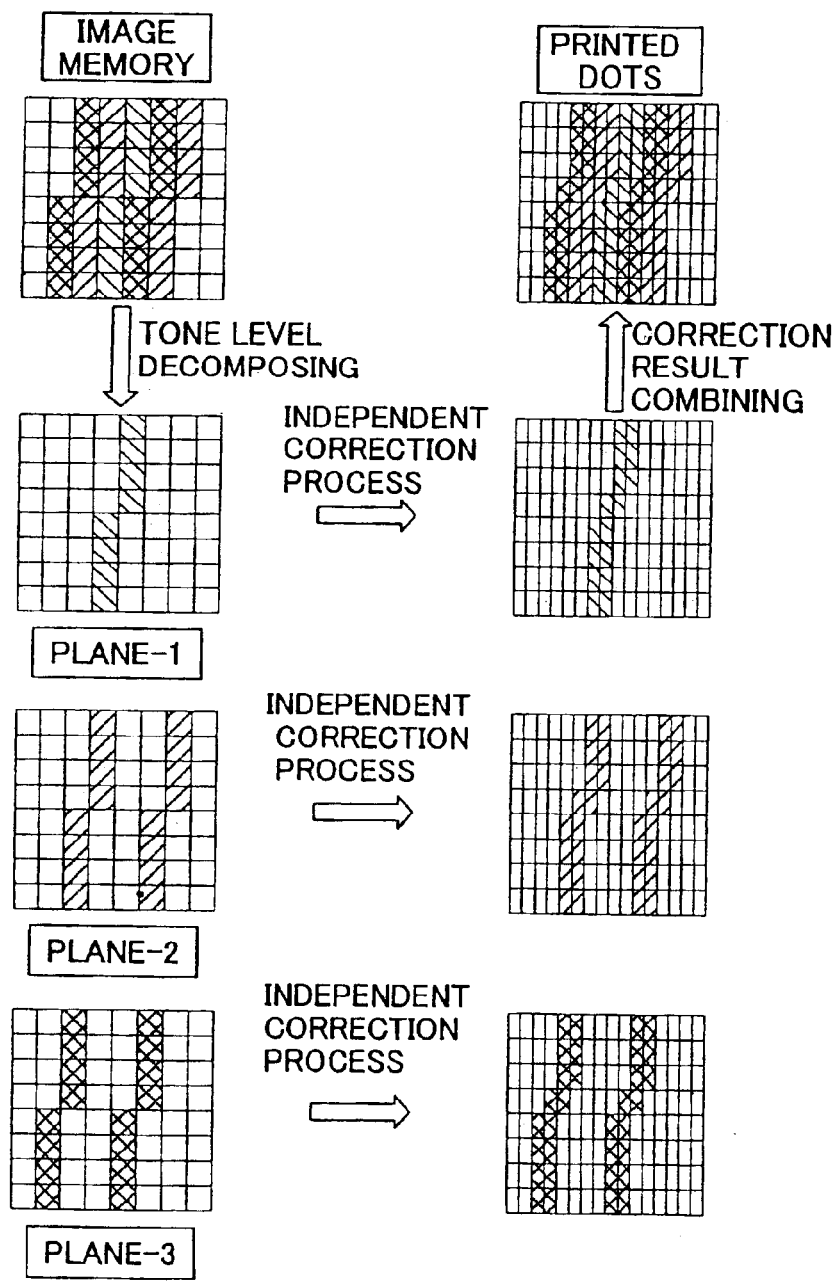
FIG. 8 is a diagram for explaining the smoothing process with respect to the multi-value print data.
Figure 9:
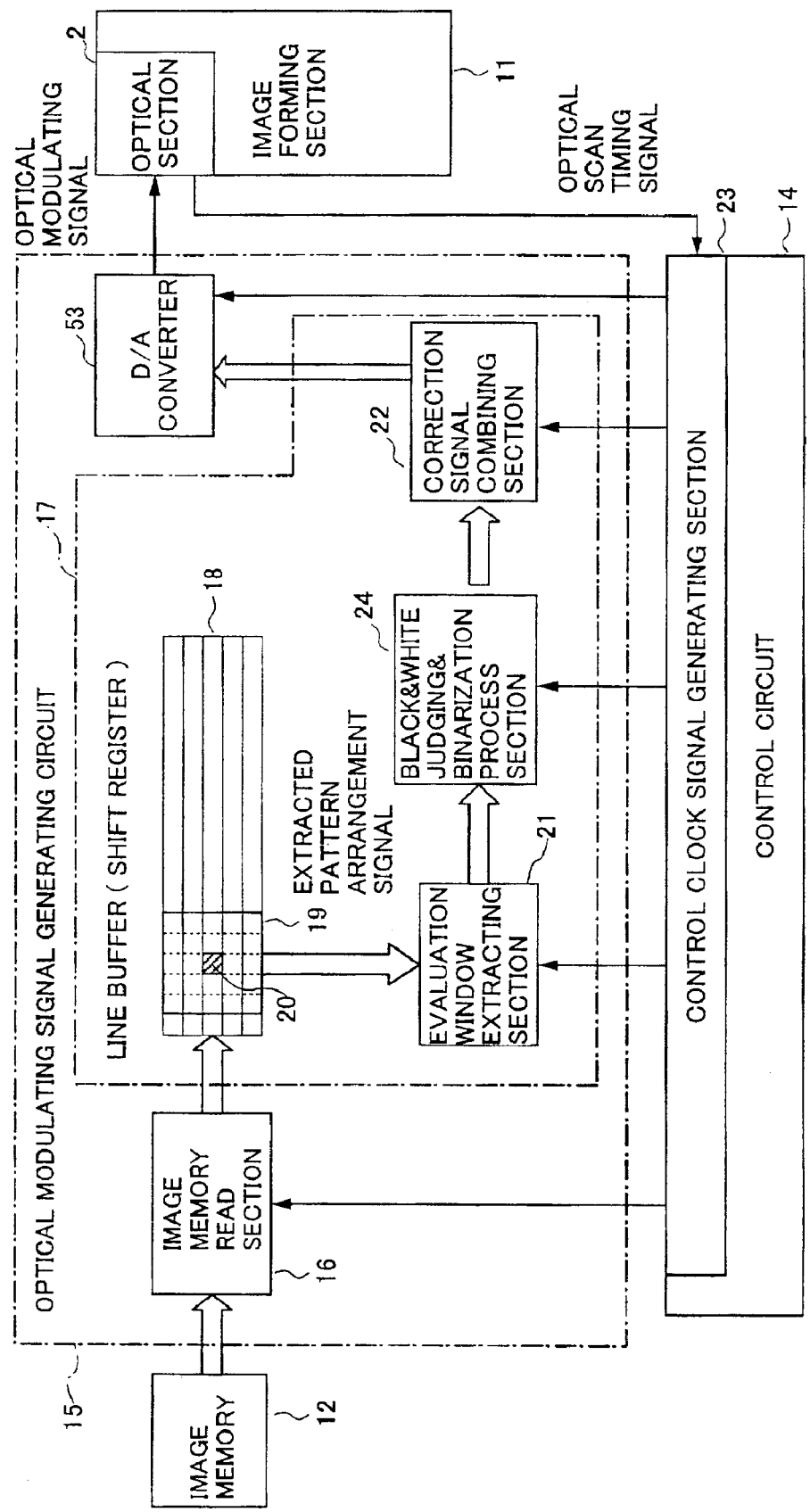
FIG. 9 is a system block diagram showing an embodiment of a smoothing circuit according to the present invention.

FIG. 9 is a system block diagram showing an embodiment of the smoothing circuit according to the present invention. This embodiment of the smoothing circuit employs an embodiment of a smoothing method according to the present invention. In addition, in this embodiment, the present invention is applied to a laser beam printer which is capable of printing in 16 gradation levels including black and white, in units of printing pixels. Accordingly, FIG. 9 shows the general construction of the laser beam printer which is provided with an optical modulating signal generating circuit 15 including this embodiment of the smoothing circuit. In FIG. 9, those parts which are the same as those corresponding parts in FIG. 3 are designated by the same reference numerals, and a description thereof will be omitted.

Figure 1:
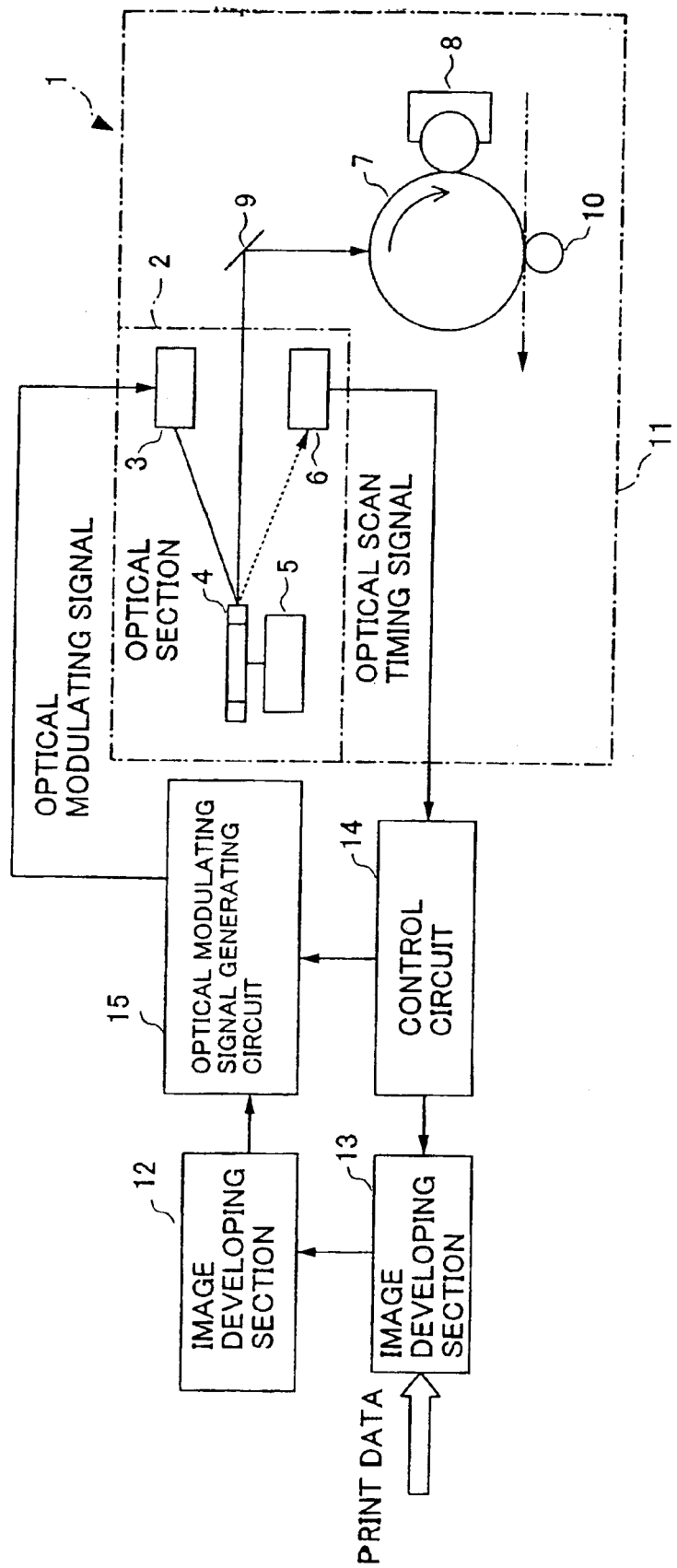
FIG. 1 is a diagram showing the construction of an example of a conventional laser beam printer.
Figure 2A:
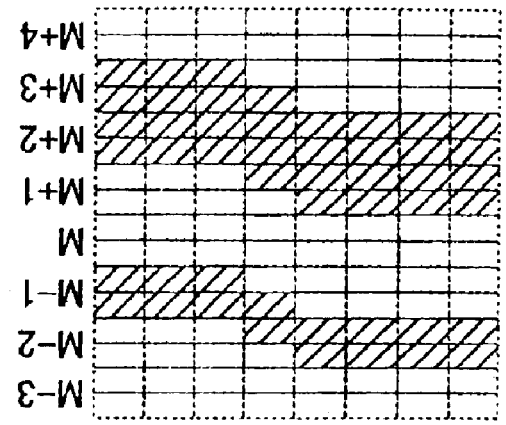
FIGS. 2A through 2C are diagrams for explaining an example of a smoothing process with respect to binary image data.
Figure 2B:
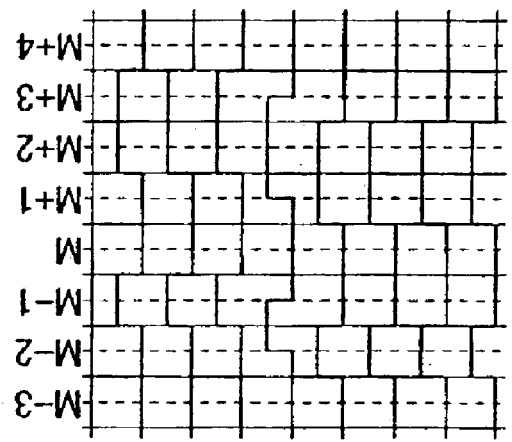
Figure 2C:
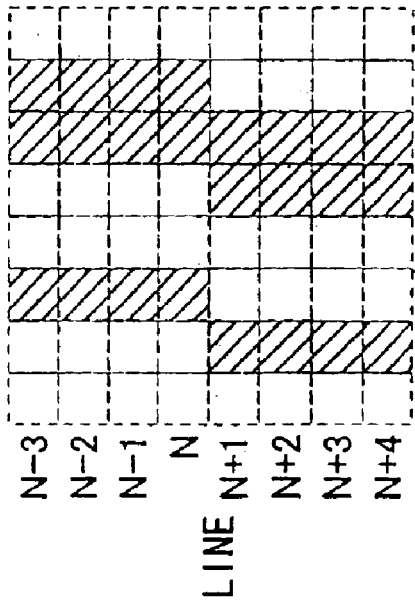

In FIG. 9, an optical section 2 and an image forming section 11 of a main body (not shown) of the laser beam printer have the same construction as those shown in FIG. 1. An image memory 12 is made up of a 4-bit bit-map memory, and the image data is developed in advance in the image memory 12 in a printable state by an image developing section (not shown). Because 15 gradation levels can be represented excluding white in units of printing pixels, the tone of the printing pixel is represented by numerical values 0 to 15. The larger numerical value of the tone indicates a higher (darker) tone, the tone 0 indicates white, and the tone 15 indicates black.

The optical modulating signal generating circuit 15 is controlled so as to output an optical modulating signal in synchronism with the progress of an image write process in the main body, in response to a plurality of control clock signals generated by a control clock signal generating section 23 of a control circuit 14 based on an optical scan timing signal output from the optical section 2. The multi-value pixel data read from the image memory 12 by an image memory read section 16 is supplied to a smoothing circuit 17. The smoothing circuit 17 includes a line buffer 18, an evaluation window extracting section 21, a black and white judging and binarization section 24, and a correction signal generating section 22. The construction of the smoothing circuit 17 is the same as that of the corresponding part of the conventional monochromatic binary printing apparatus shown in FIG. 3, except for the black and white judging and binarization process section 24, and the description of the corresponding parts having the same construction will be omitted. The black and white judging and binarization process section 24 will be described later.

A correction signal (correction value) output from the smoothing circuit 17 is supplied to a D/A converter 53. An output signal of the D/A converter 53 is supplied to a laser diode of the optical section 2 as an optical modulating signal. Other parts are the same as the corresponding parts shown in FIG. 3.

Next, a description will be given of the smoothing circuit 17 of this embodiment, and particularly to a black and white judgement of a target pixel and a binarization process of the evaluation window carried out in the black and white judging and binarization process section 24, and a process of converting the correction signal into a multi-value signal in the correction signal generating section 22.

For the sake of convenience, a description will be given of a case where the pixel is described by 4 bits to represent 16 gradation levels, the evaluation window size is 3×3 pixels, and a division is made into two in a main scanning direction. Hence, the data of each dot is represented by 4 bits, where d=0 for white and d=15 for black, and the value of d increases for higher (darker) tones.

Figures 10, 11:
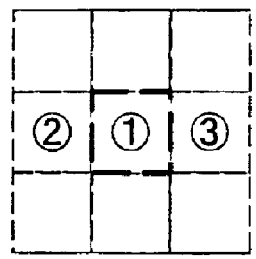
FIG. 10 is a diagram showing a relationship of a target pixel and adjacent pixels within an evaluation window.
FIG. 11 is a diagram showing a result of a binarization process for a case where a threshold value th2=2.

1. Black And White Judgement of Target Pixel:

It is assumed for the sake of convenience that the relationship of a target pixel ① and adjacent (or neighboring) pixels ② and ③ within the evaluation window is as shown in FIG. 10. When a value of the target pixel ① is denoted by d1, values of the adjacent pixels ② and ③ are respectively denoted by d2 and d3, and an arbitrary threshold value is denoted by th, the black and white judging and binarization process section 24 decides whether or not a relationship max(d2, d3)−d1>th is satisfied, where max indicates a maximum value and the threshold value th is th=2, for example. When this relationship is satisfied, it is judged that the target pixel ① is more white than the peripheral pixels, and a binarization process A which will be described later is carried out. In addition, the black and white judging and binarization process section 24 judges whether or not a relationship d1−min(d2, d3)>th is satisfied, where min indicates a minimum value. When this relationship is satisfied, it is judged that the target pixel ① is more black than the peripheral pixels, and a binarization process B which will be described later is carried out. Furthermore, if neither one of the two relationships is satisfied, it is judged that the target pixel ① is approximately the same as the peripheral pixels, and the value d1 of target pixel ① is output as it is.

2.2 Binarization Process:

A description will be given of the process carried out by the black and white judging and binarization process section 24 for this case. The black and white judging and binarization process section 24 carries out the binarization process A and the binarization process B.

In the case where target pixel ① is white, the binarization process A regards pixels having values less than d1+th/2 as being white (0), and replaces pixels having other values to black (1), before advancing to a look-up table (LUT) collating process which will be described later.

In the case where target pixel ① is black, the binarization process B regards pixels having values less than d1−th/2 as being white (0), and replaces pixels having other values to black (1), before advancing to the LUT collating process which will be described later. FIG. 11 is a diagram showing a result of the binarization process B for this case where the threshold value th is th=2.

3. LUT Collating Process:

A description will be given of the correction signal generating section 22 for this case.

The correction signal generating section 22 collates the result of the binarization process and various kinds of patterns in vicinities with respect to target pixel. The correction signal generating section 22 outputs a correction value if a matching pattern exists, and outputs the value d1 of the target pixel ① as it is if no matching pattern exists.

This process of the correction signal generating section 22 is similar to that of the conventional correction signal generating method described above in conjunction with FIGS. 3 and 4A through 4D. But since the correction value is a binary data in this case, a process described hereunder is carried out to convert the binary correction value back to the multi-value correction value. There are the following two techniques for converting the binary data to the multi-value data by a correction value multi-value process.

Figure 12:
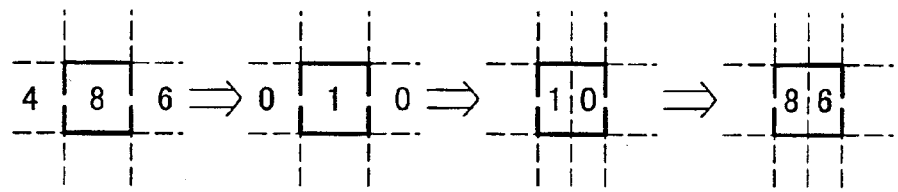
FIG. 12 is a diagram showing a state where a correction value output is obtained by a correction value multi-value process using simple replacement.

4. Correction Value Multi-Value process:

4a. Simple Replacement:

In the case of the simple replacement, if the target pixel ① is black, that is, if the dot is to be deleted by the correction, the original data (d1) is maintained at the portion where the dot is to remain and the data is replaced by an adjacent data at the portion where the dot is to be deleted. FIG. 12 is a diagram showing a state where a correction value output is obtained by the correction value multi-value process using simple replacement.

Figure 13:
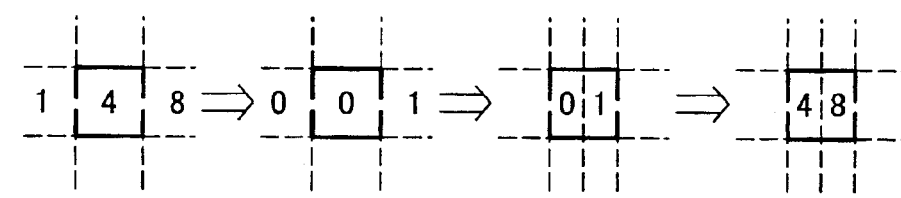
FIG. 13 is a diagram showing the state where the correction value output is obtained by the correction value multi-value process using simple replacement.

On the other hand, if the target pixel ① is white, that is, if the dot is to be added by the correction, the original data (d1) is maintained at the background portion and the data is replaced by an average adjacent data at the portion where the dot is to be added. FIG. 13 is a diagram showing the state where the correction value output is obtained by the correction value multi-value process using simple replacement.

Figure 14:
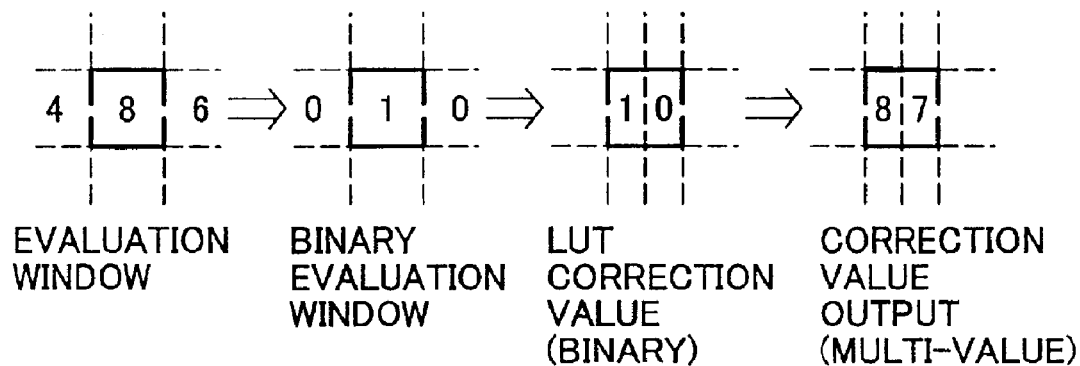
FIG. 14 is a diagram showing a state where a correction value output is obtained by a correction value multi-value process using averaging.

4n. Averaging:

In the case of the averaging, if the target pixel ① is black, that is, if the dot is to be deleted by the correction, the original data (d1) is maintained at the portion where the dot is to remain and the data is replaced by an intermediate value which is an average value of the target pixel and the adjacent pixels at the portion where the dot is to be deleted. FIG. 14 is a diagram showing a state where a correction value output is obtained by a correction value multi-value process using averaging.

Figure 15:
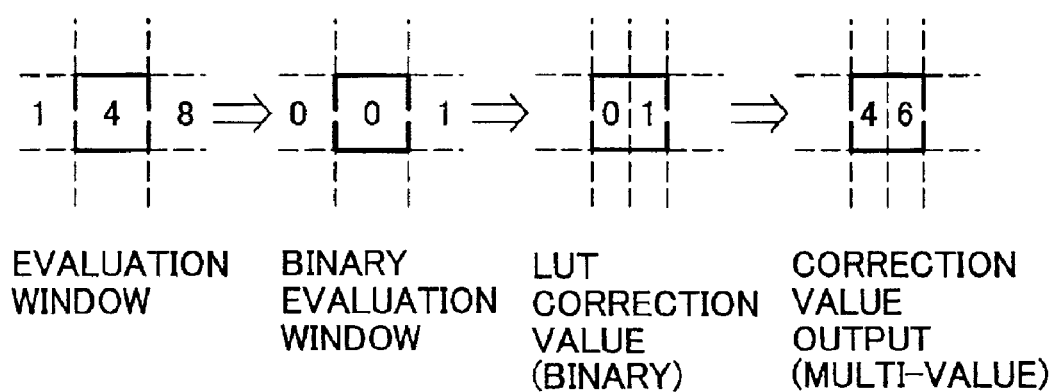
FIG. 15 is a diagram showing the state where the correction value output is obtained by the correction value multi-value process using averaging.

On the other hand, if the target pixel ① is white, that is, if the dot is to be added by the correction, the original data (d1) is maintained at the background portion and the data is replaced by an intermediate value which is an average value of the target pixel and the adjacent pixels at the portion where the dot is to be added. FIG. 15 is a diagram showing the state where the correction value output is obtained by the correction value multi-value process using averaging.

Of the correction value multi-value processes described above, the simple replacement enables the edges to remain sharp after the correction, while the averaging smoothens the edges after the correction.

Figure 16:
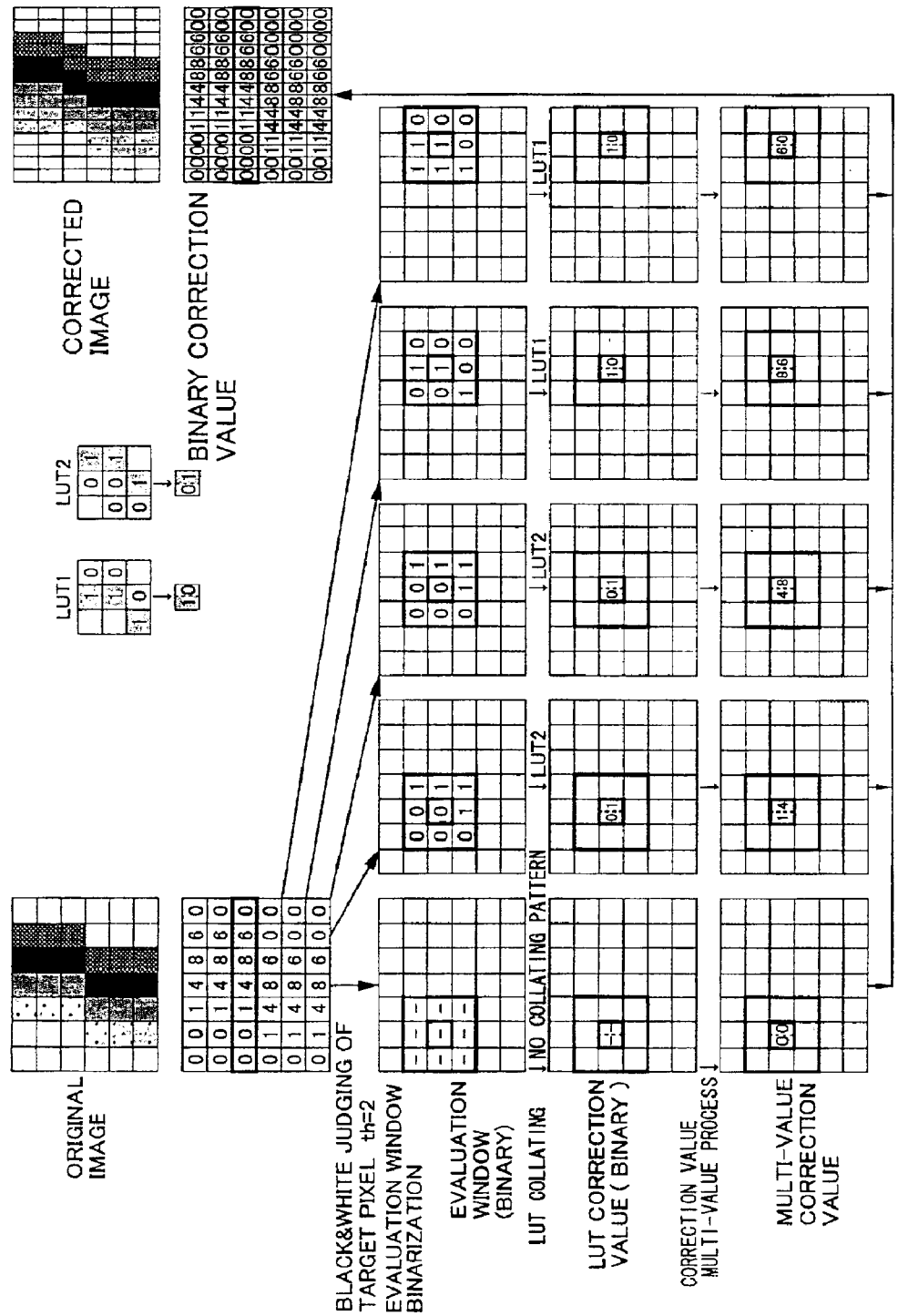
FIG. 16 is a diagram for explaining a process of the embodiment.

FIG. 16 is a diagram for explaining a process of this embodiment. It is assumed for the sake of convenience that the pattern of the original image includes four vertical lines having four different lines arranged side by side and including a jaggy portion at an intermediate portion thereof as shown on the top left in FIG. 16. It is also assumed that the pixel data of this pattern is developed in a bit-map memory which forms the image memory 12, as shown on the second from the top left in FIG. 16. As shown on the lower part of FIG. 16, evaluation windows having a size of 3×3 pixels are successively extracted from this pattern and collated with the look-up table, and the correction value multi-value process is carried out. The look-up table stores various kinds of patterns in a vicinity with respect to the target pixel. As a result, a corrected image, that is, a printed result, shown on the top right in FIG. 16 is obtained.

Figure 17:
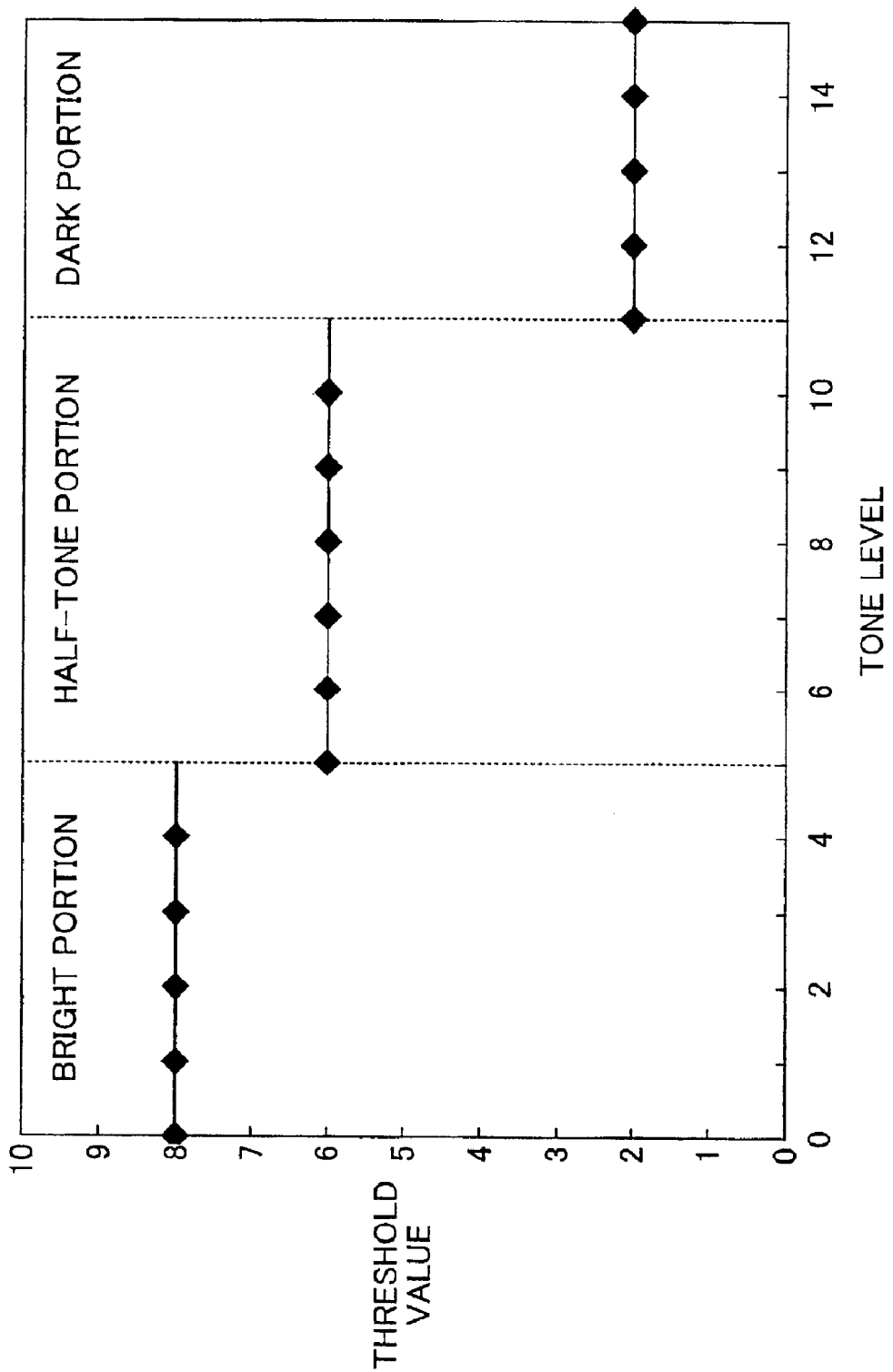
FIG. 17 is a diagram showing a relationship of a threshold value and a tone level for dynamically varying a binarization threshold value depending on a tone level of the target pixel.

FIG. 17 is a diagram showing a relationship of a threshold value and a tone level for dynamically varying a binarization threshold value depending on a tone level of the target pixel. In the case shown in FIG. 17, the value (level) of the target pixel ① is divided into three, namely, a bright portion, a half-tone portion and a dark portion, and a different threshold value is set for each portion. Normally, the character or line drawing having conspicuous jaggy has a dark tone, and thus, the threshold value is set relatively small so that the smoothing process is effectively carried out. On the other hand, the bright portion and the half-tone portion are in many cases natural images such as photographs, and the need for a smoothing process is small. In the case of the natural image, the image quality may even become deteriorated if the smoothing process is carried out. Hence, in the bright portion and the half-tone portion, the threshold value is set to a relatively large value, so that the smoothing process will not be carried out at portions where the tone change is small.

By making the threshold value variable, it becomes possible to control whether or not to carry out the smoothing process, to thereby improve the degree of freedom of image quality design of the printer. Such a control may be carried out using a simple table, and thus, the scale of the hardware will not become large due to such a control.

Figure 18:
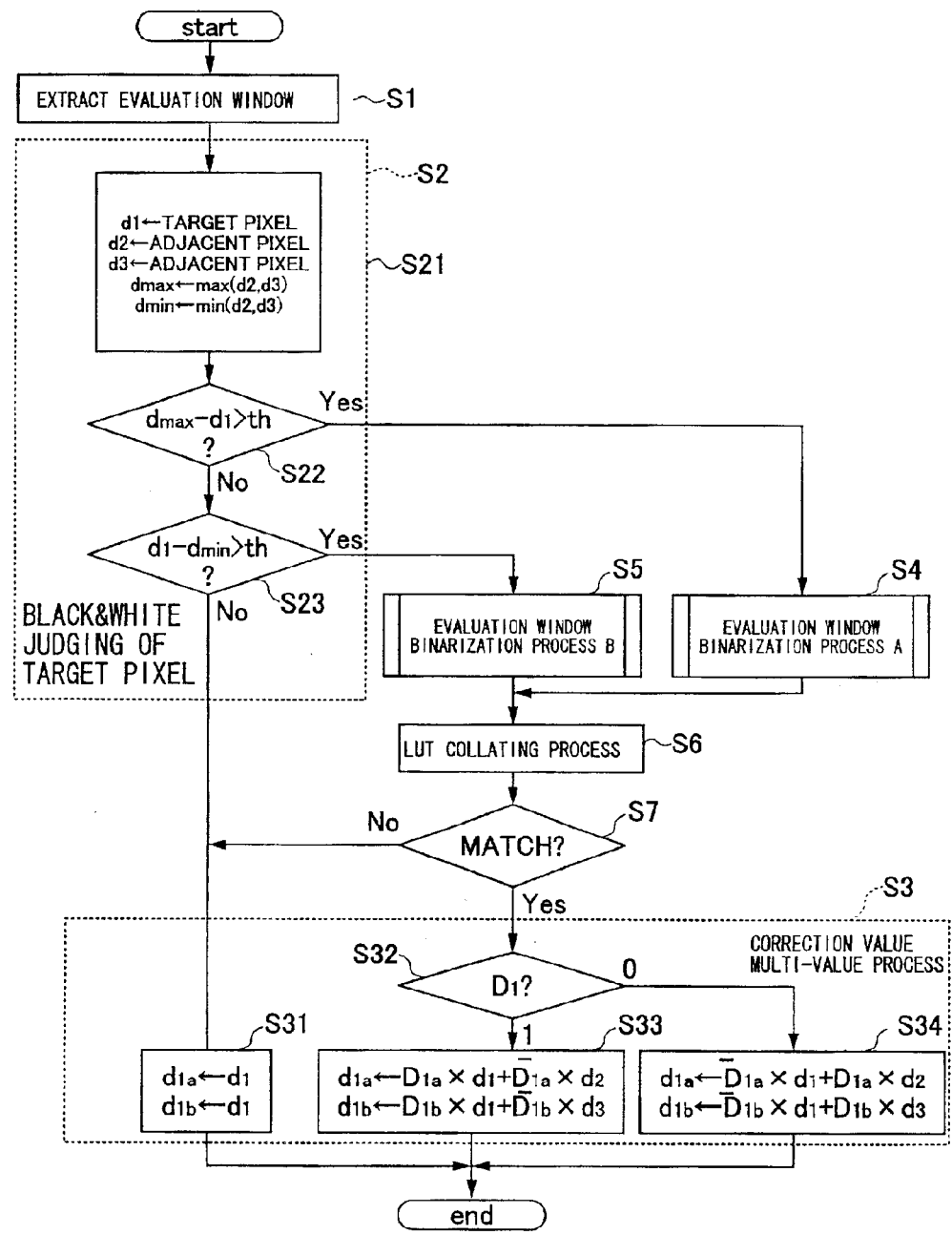
FIG. 18 is a flow chart for explaining the operation of the smoothing circuit.
Figure 19:
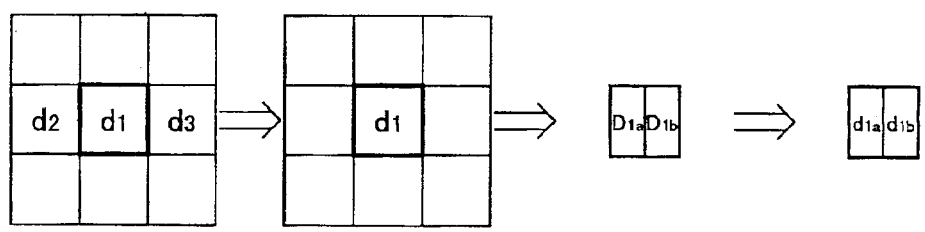
FIG. 19 is a diagram for explaining a process from extraction of the evaluation window to conversion of the correction value to multi-value.

Next, a more detailed description will be given of the operation of an important part of the smoothing circuit 17 of this embodiment, by referring to FIGS. 18 trough 21. FIG. 18 is a flow chart for explaining the operation of the smoothing circuit 17, and corresponds to this embodiment of the smoothing method. In addition, FIG. 19 is a diagram for explaining a process from extraction of the evaluation window to conversion of the correction value to multi-value.

In FIG. 18, a step S1 extracts the evaluation window from the pixel data held in the line buffer 18, by the evaluation window extracting section 21. A step S2 carries out the black and white judgement with respect to the target pixel as described above, by the black and white judging and binarization process section 24 More particularly, the step S2 includes steps S21 through S23. The step S21 sets the value (level) of the target pixel ① to d1, sets the values (levels) of the adjacent pixels ② and ③ respectively to d2 and d3, and sets max(d2, d3) to dmax, and sets min(d2, d3) to dmin. The step S22 decides whether or not dmax−d1>th, and the process advances to a step S4 which will be described later if the decision result in the step S22 is YES. On the other hand, if the decision result in the step S22 is NO, the step S23 decides whether or not d1−dmin>th, and the process advances to a step S5 which will be described later if the decision result in the step S23 is YES. If the decision result in the step S23 is NO, the process advances to a step S3, more particularly, to a step S31.

The step S3 carries out the correction value multi-value process described above by the correction signal generating section 22. More particularly, the step S3 includes steps S31 through S34. The step S31 sets d1 to d1a, sets d1 to d1b, and the process ends. The steps S32 through S34 will be described later.

Figure 20:
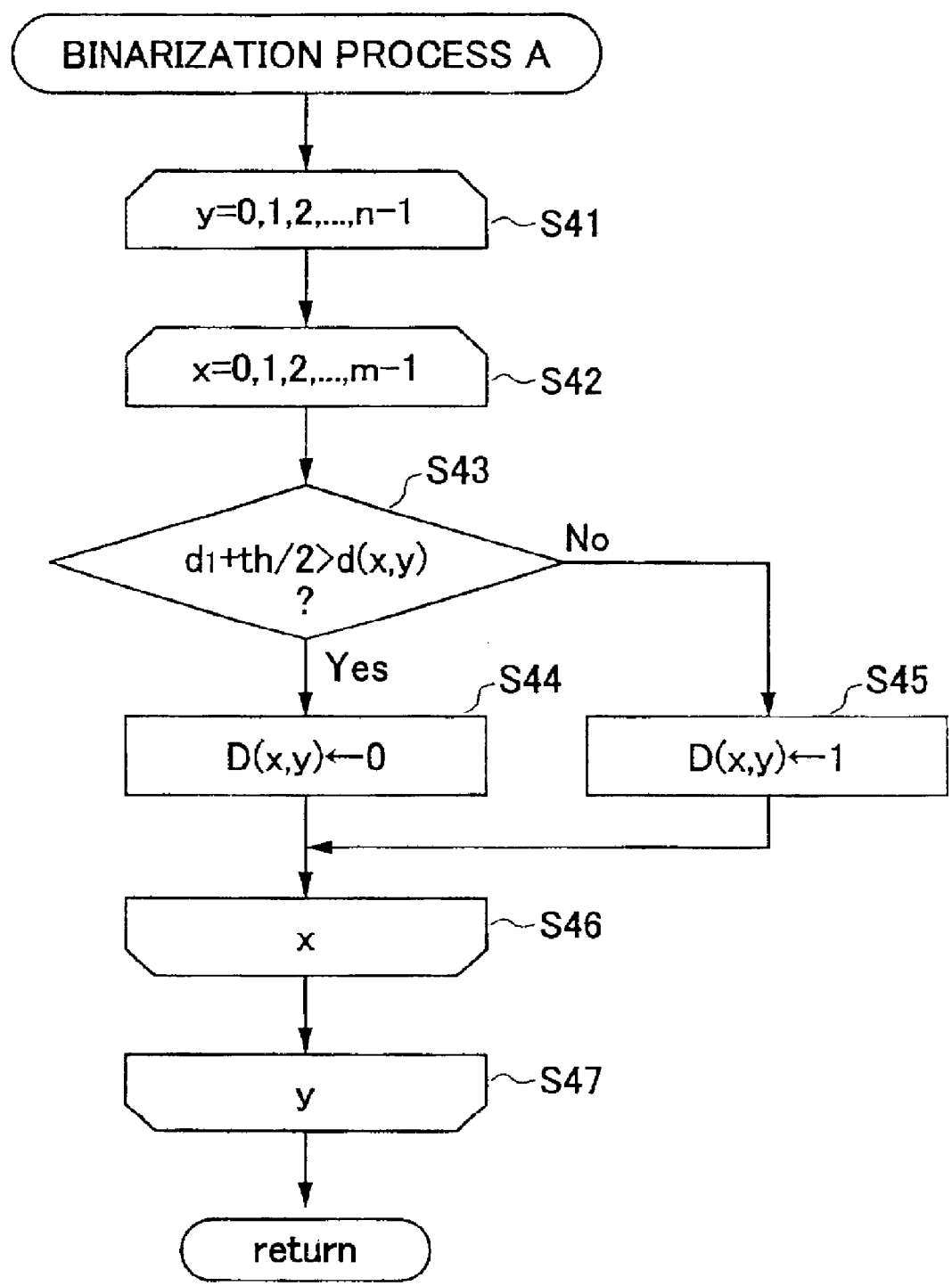
FIG. 20 is a flow chart for explaining a binarization process A.

The step S4 carries out the binarization process A shown in FIG. 20 by the black and white judging and binarization process section 24. The step S5 carries out the binarization process B shown in FIG. 21 by the black and white judging and binarization process section 24.

FIG. 20 is a flow chart for explaining the binarization process A carried out by the step S4. In FIG. 20, a step S41 sets y to y=0, 1, 2, . . . , n−1, and a step S42 sets x to x=0, 1, 2, . . . , m−1. A step S43 decides whether or not d1+th/2>d(x, y). If the decision result in the step S43 is YES, a step S44 sets 0 to D(x, y). On the other hand, if the decision result in the step S43 is NO, a step S45 sets 1 to D(x, y). After the step S44 or S45, a step S46 outputs x, a step S47 outputs y, and the process returns to the process shown in FIG. 18 to advance to the step S6.

Figure 21:
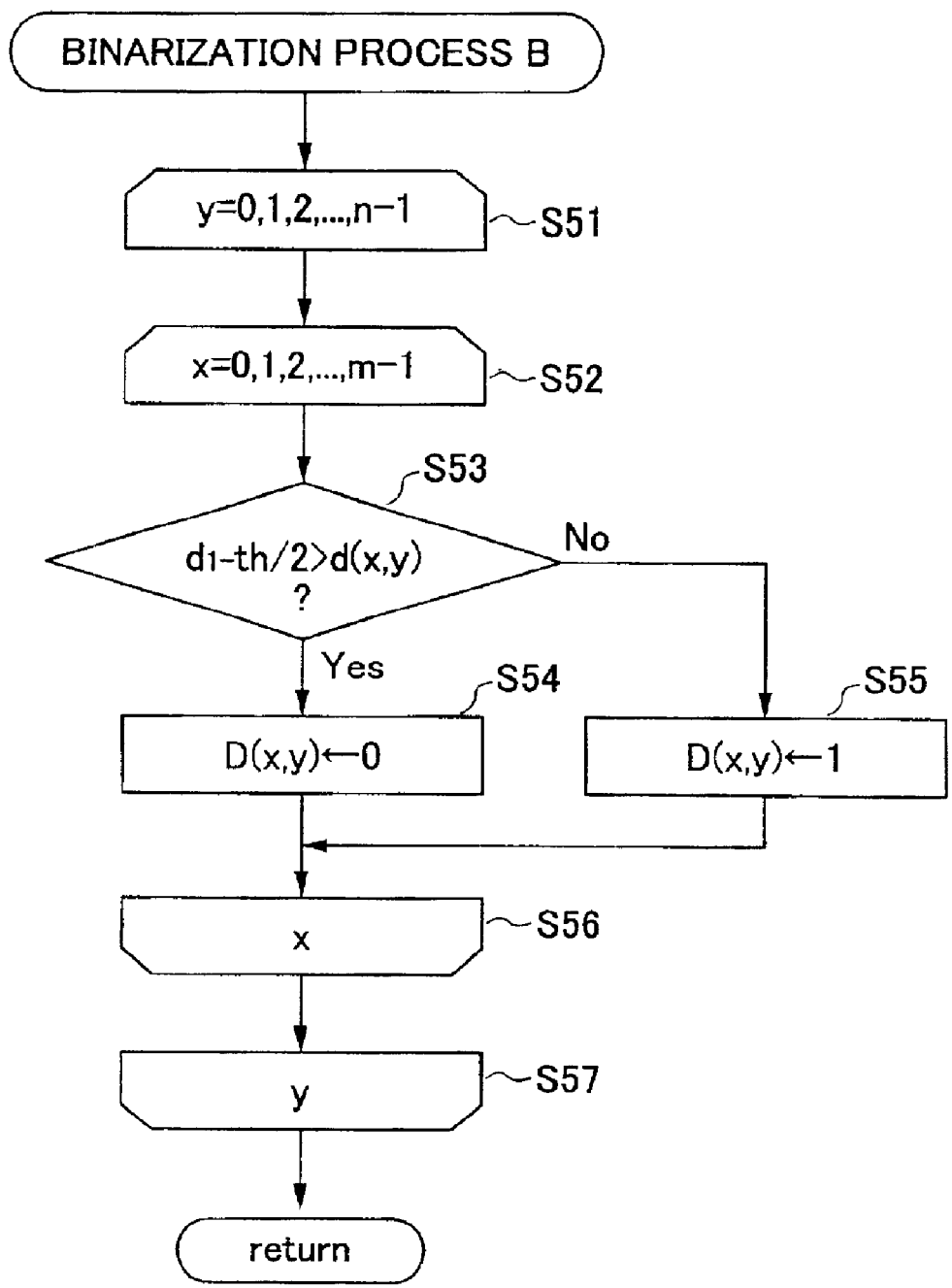
FIG. 21 is a flow chart for explaining a binarization process B.

FIG. 21 is a flow chart for explaining the binarization process B carried out by the step S5. In FIG. 21, a step S51 sets y to y=0, 1, 2, . . . , n−1, and a step S52 sets x to x=0, 1, 2, . . . , m−1. A step S53 decides whether or not d1−th/2>d(x, y). If the decision result in the step S53 is YES, a step S54 sets 0 to D(x, y). On the other hand, if the decision result in the step S53 is NO, a step S55 sets 1 to D(x, y). After the step S54 or S55, a step S56 outputs x, a step S57 outputs y, and the process returns to the process shown in FIG. 18 to advance to the step S6.

Returning now to the description of FIG. 18, after the step S4 or S5, the step S6 carries out the LUT collating process describe above by the correction signal generating section 22, so as to collate the result of the binarization process and the look-up table (LUT). In addition, a step S7 decides by the correction signal generating section 22 whether or not a matching pattern exists as a result of the LUT collating process. If the decision result in the step S7 is NO, it is judged that the need for the smoothing process is small or, the image data is such that the image quality will be deteriorated if the smoothing process is carried out, and the process advances to the step S31 of the step S3. On the other hand, if the decision result in the step S7 is YES, the process advances to the step S32 of the step S3.

The step S32 decides whether or not the value (level) D1 of the binary evaluation window corresponding to the target, pixel ① (d1) of the evaluation window is 0 or 1, as shown in FIG. 19. If D1 is 1, the step S33 sets D1a×d1+D1a*×d2 to d1a, D1b×d1+D1b*×d3 to d1b, and the process ends, where "*" denotes a "bar" (or inversion) indicated in the steps S33 and S34 shown FIG. 18. On the other hand, if D1 is 0, the step S34 sets D1a*×d1+D1a×d2 to d1a, sets D1b*×d1+D1b×d3 to d1b, and the process ends.

Therefore, according to the present invention, a look-up table which is basically the same as the look-up table of the binary printing apparatus can be used as the look-up table required in the image output apparatus which outputs the multi-value image, and by using this look-up table, it is possible to carry out the smoothing process which makes the jaggy and the like generated at the time of outputting the image less conspicuous. In other words, it is possible to realize a multi-value smoothing process using a simple construction and at a low cost.

In addition, even when the number of multi-value levels are set large in order to improve the picture quality of the photograph image and the like, the smoothing process can be carried out without increasing the scale of the required hardware. Furthermore, the conventional technique can be used as it is for the extraction of the evaluation window, the collating with the look-up table, the multi-value data printing process and the like.

Figure 22:
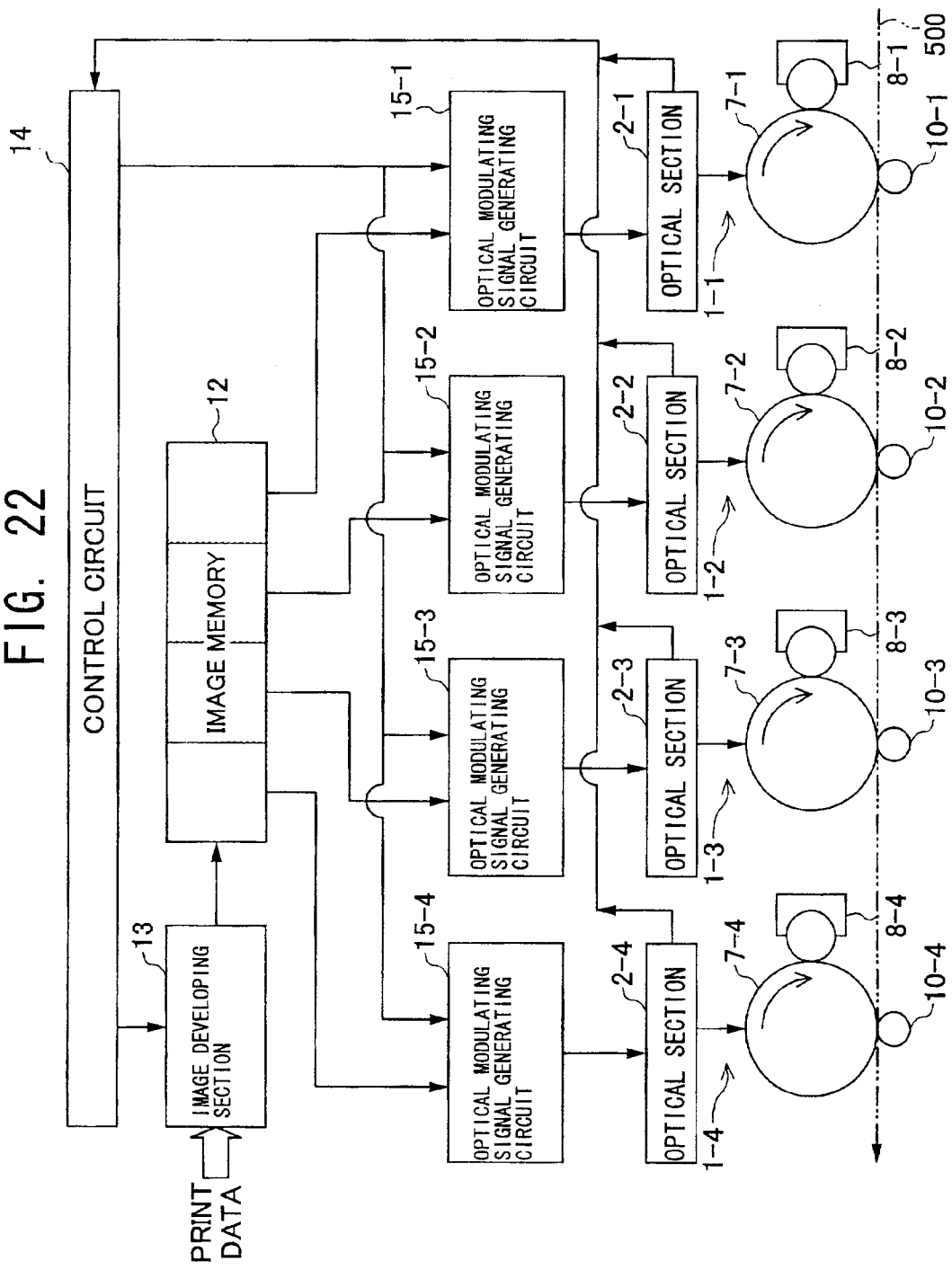
FIG. 22 is a diagram showing the general construction of a color printer for a case where the present invention is applied to the color printer.

Moreover, it is of course possible to apply the present invention to a color printer. FIG. 22 is a diagram showing the general construction of a color printer for a case where the present invention is applied to the color printer. In FIG. 22, those parts which are the same as those corresponding parts in FIGS. 1 and 9 are designated by the same reference numerals, and a description thereof will be omitted.

As shown in FIG. 22, the color printer includes four optical modulating signal generating circuits 15-1 through 15-4, and four main bodies 1-1 through 1-4. The construction of each of the optical modulating signal generating circuits 15-1 through 15-4 is the same as the construction of the optical modulating signal generating circuit 15 shown in FIG. 9. In addition, the construction of each of the main bodies 1-1 through 1-4 is the same as the construction of the main body 1 shown in FIG. 1. For example, the main body 1-1 has a known construction including an optical section 2-1, a photoconductive drum 7-1, a developing unit 8-1, a transfer roller 10-1 and the like. Since the image forming part is made up of four systems designated by suffixes "-1" through "-4", the storage region within the image memory 12 is also divided into four systems as indicated by a dotted line in FIG. 22, so as to facilitate management of the image data.

The image forming parts of the four systems use yellow (Y), magenta (M), cyan (C) and black (K) to successively form on a recording medium 500, such as paper, images which are respectively subjected to the smoothing process of the present invention within the optical modulating signal generating circuits 15-1 through 15-4 of the four corresponding systems. Of course, the order in which the color images are successively formed is not limited to the order Y→M→C→K described above.

In the embodiment described above, the present invention is applied to the printer. However, it is of course possible to similarly apply the present invention to a display unit.

Further, the present invention is not limited to these embodiments, but various variations and modifications may be made without departing from the scope of the present invention.

What is claimed is:

1. A smoothing method comprising the steps of:
   (a) extracting an evaluation window including a target pixel of a multi-value image data in which tone is represented by a multi-value in units of pixels;
   (b) judging black and white of the target pixel according to a predetermined rule, and binarizing pixel data within the evaluation window; and
   (c) generating a binary correction value based on collating binarized pixel data within the evaluation window and a look-up table which stores patterns in vicinities of the target pixel, converting the binary correction value to a multi-value correction value with reference to an original multi-value image data, and outputting a multi-value correction signal in which the binary correction value is converted into a multi-value correction value,
   wherein step (c) sets a portion where a dot is to remain after correction is to a value of an original data and a portion where the dot is to be deleted to an intermediate value between the target pixel and an adjacent dot if the target pixel is judged as being black, and sets a portion which becomes a background portion to the value of the original data and sets a portion where the dot is to be added to an intermediate value between the target pixel and an adjacent dot if the target pixel is judged as being white.

2. The smoothing method as claimed in claim 1, wherein said step (b) judges the black and white of the target pixel based on whether or not a difference between pixel data of the target pixel and the adjacent pixels is greater than or equal to a predetermined threshold value, and binarizes the pixel data within the evaluation window based on a result of the black and white judging.

3. The smoothing method as claimed in claim 2, wherein the predetermined threshold value is set by dividing a multi-value level for every predetermined range.

4. A smoothing circuit comprising:
   an evaluation window extracting section extracting an evaluation window including a target pixel of a multi-value image data in which tone is represented by a multi-value in units of pixels;
   a black and white judging and binarization process section judging black and white of the target pixel according to a predetermined rule, and binarizing pixel data within the evaluation window; and
   a correction signal generating section generating a correction value based on collating binarized pixel data within the evaluation window and a look-up table which stores patterns in vicinities of the target pixel, and outputting a multi-value correction signal in which the correction value is converted into a multi-value,
   wherein said correction signal generating section generates a binary correction value by collating the evaluation window and the look-up table, and converts the binary correction value to the multi-value correction value with reference to an original multi-value image data, and
   wherein said correction signal generating section sets a portion where a dot is to remain after correction is to a value of an original data and a portion where the dot is to be deleted to an intermediate value between the target pixel and an adjacent dot if the target pixel is judged as being black, and sets a portion which becomes a background portion to the value of the original data and sets a portion where the dot is to be added to an intermediate value between the target pixel and an adjacent dot if the target pixel is judged as being white.

5. The smoothing circuit as claimed in claim 4, wherein said black and white judging and binarization process section judges the black and white of the target pixel based on whether or not a difference between pixel data of the target pixel and the adjacent pixels is greater than or equal to a predetermined threshold value, and binarizes the pixel data within the evaluation window based on a result of the black and white judging.

6. The smoothing circuit as claimed in claim 5, wherein the predetermined threshold value is set by dividing a multi-value level for every predetermined range.

7. An image output apparatus comprising:
a smoothing circuit which smoothens an input multi-value image data; and
an image output section outputting image data smoothened by said smoothing circuit,
said smoothing circuit comprising:
an evaluation window extracting section extracting an evaluation window including a target pixel of the input multi-value image data in which tone is represented by a multi-value in units of pixels;
a black and white judging and binarization process section judging black and white of the target pixel according to a predetermined rule, and binarizing pixel data within the evaluation window; and
a correction signal generating section generating a correction value based on collating binarized pixel data within the evaluation window and a look-up table which stores patterns in vicinities of the target pixel, and outputting a multi-value correction signal in which the correction value is convened into a multi-value,
wherein said correction signal generating section generates a binary correction value by collating the evaluation window and the look-up table, and converts the binary correction value to the multi-value correction value with reference to an original multi-value image data, and
wherein said correction signal generating section sets a portion where a dot is to remain after correction is to a value of an original data and a portion where the dot is to be deleted to an intermediate value between the target pixel and an adjacent dot if the target pixel is judged as being black, and sets a portion which becomes a background portion to the value of the original data and sets a portion where the dot is to be added to an intermediate value between the target pixel and an adjacent dot if the target pixel is judged as being white.

8. The image output apparatus as claimed in claim 7, wherein said image output section is selected from a group consisting of a printer and a display.

9. A smoothing method comprising the steps of:
(a) extracting an evaluation window including a target pixel of a multi-value image data in which tone is represented by a multi-value in units of pixels;
(b) judging black and white of the target pixel according to a predetermined rule, and binarizing pixel data within the evaluation window; and
(c) generating a binary correction value based on collating binarized pixel data within the evaluation window and a look-up table which stores patterns in vicinities of the target pixel, converting the binary correction value to a multi-value correction value with reference to an original multi-value image data, and outputting a multi-value correction signal in which the binary correction value is converted into a multi-value correction value,
wherein if the dot is to be deleted by the correction, the original data is maintained at the portion where the dot is to remain and the data is replaced by an adjacent data at the portion where the dot is to be deleted, and if the dot is to be added by the correction, the original data is maintained at the background portion and the data is replaced by an adjacent data at the portion where the dot is to be added.

10. A smoothing circuit comprising:
an evaluation window extracting section extracting an evaluation window including a target pixel of a multi-value image data in which tone is represented by a multi-value in units of pixels;
a black and white judging and binarization process section judging black and white of the target pixel according to a predetermined rule, and binarizing pixel data within the evaluation window; and
a correction signal generating section generating a correction value based on collating binarized pixel data within the evaluation window and a look-up table which stores patterns in vicinities of the target pixel, and outputting a multi-value correction signal in which the correction value is converted into a multi-value,
wherein said correction signal generating section generates a binary correction value by collating the evaluation window and the look-up table, and converts the binary correction value to the multi-value correction value with reference to an original multi-value image data, and
wherein said correction signal generating section sets a portion where a dot is to remain after correction is to a value of an original data and a portion where the dot is to be deleted to an adjacent value between the target pixel and an adjacent dot if the target pixel is judged as being black, and sets a portion which becomes a background portion to the value of the original data and sets a portion where the dot is to be added to an adjacent value between the target pixel and an adjacent dot if the target pixel is judged as being white.

11. An image output apparatus comprising:
a smoothing circuit which smoothens an input multi-value image data; and
an image output section outputting image data smoothened by said smoothing circuit,
said smoothing circuit comprising:
an evaluation window extracting section extracting an evaluation window including a target pixel of the input multi-value image data in which tone is represented by a multi-value in units of pixels;
a black and white judging and binarization process section judging black and white of the target pixel according to a predetermined rule, and binarizing pixel data within the evaluation window; and
a correction signal generating section generating a correction value based on collating binarized pixel data within the evaluation window and a look-up table which stores patterns in vicinities of the target pixel, and outputting a multi-value correction signal in which the correction value is converted into a multi-value, wherein said correction signal generating section generates a binary correction value by collating the evaluation window and the look-up table, and converts the binary correction value to the multi-value correction value with reference to an original multi-value image data, and wherein said correction signal generating section sets a portion where a dot is to remain after correction is to a value of an original data and a portion where the dot is to be deleted to an adjacent value between the target pixel and an adjacent dot if the target pixel is judged as being black, and sets a portion which becomes a background portion to the value of the original data and sets a portion where the dot is to be added to an adjacent value between the target pixel and an adjacent dot if the target pixel is judged as being white.

* * * * *